G. W. BRAGDON.
SAWING MACHINE.
APPLICATION FILED JUNE 16, 1917. RENEWED APR. 2, 1920.
1,346,169.
Patented July 13, 1920.
2 SHEETS—SHEET 2.
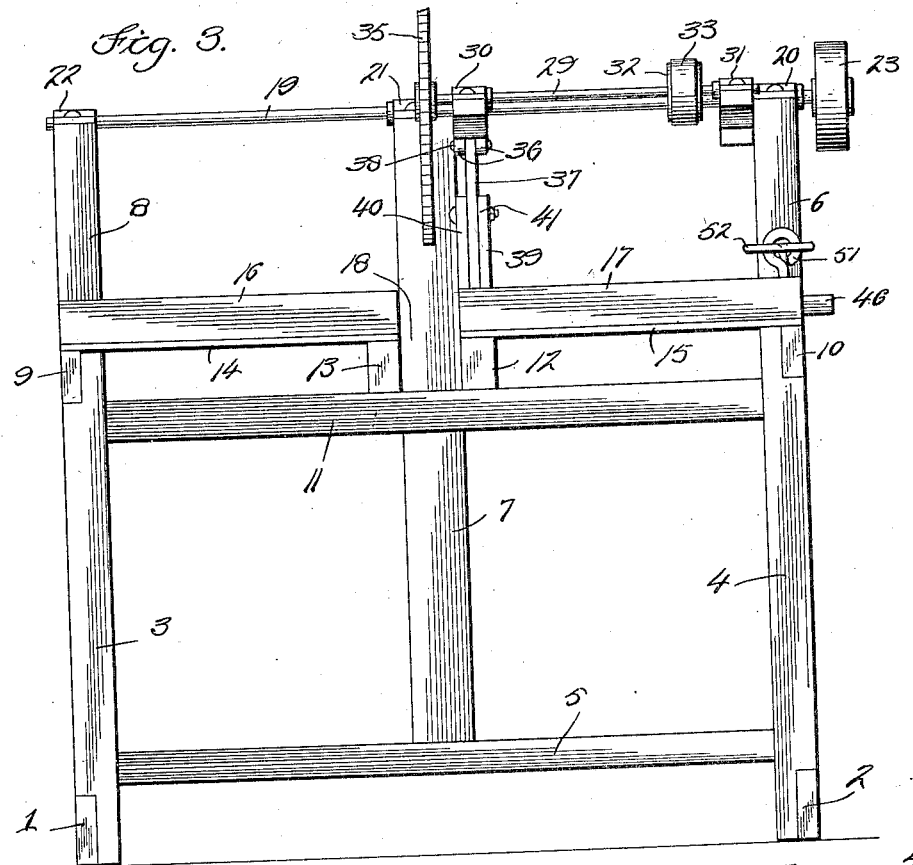
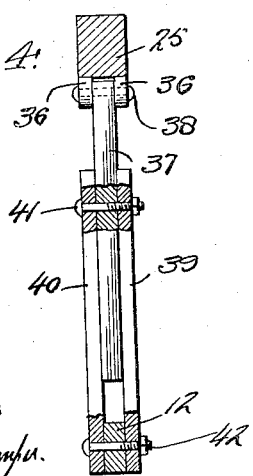
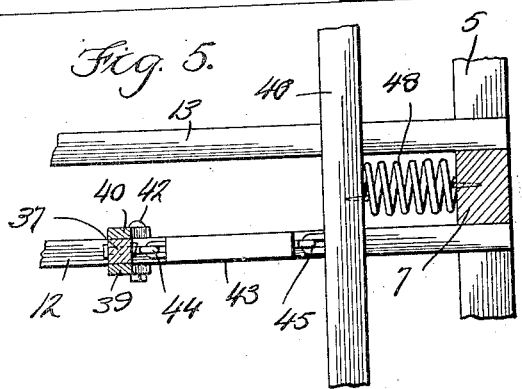
WITNESSES
Chas. E. Kempu.
H. H. Babcock.
INVENTOR
George W. Bragdon.
BY Richard B. Owen,
ATTORNEY

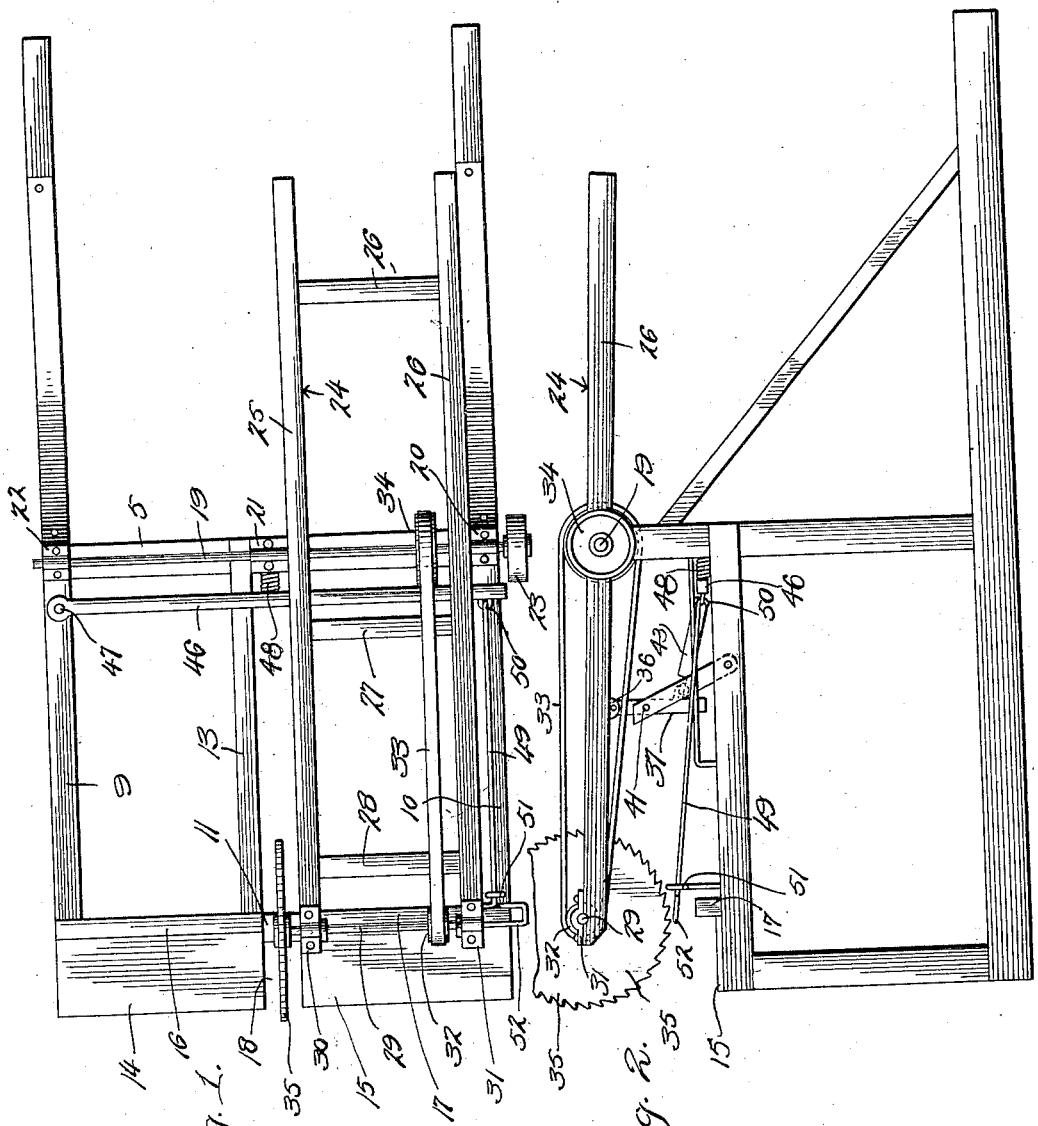

UNITED STATES PATENT OFFICE.

GEORGE W. BRAGDON, OF SMYRNA MILLS, MAINE, ASSIGNOR OF ONE-FOURTH TO P. H. TARBELL AND ONE-FOURTH TO H. J. TARBELL, BOTH OF MERRILL, MAINE.

SAWING-MACHINE.

1,346,169.      Specification of Letters Patent.      Patented July 13, 1920.

Application filed June 16, 1917, Serial No. 175,184. Renewed April 2, 1920. Serial No. 370,900.

*To all whom it may concern:*

Be it known that I, GEORGE W. BRAGDON, a citizen of the United States, residing at Smyrna Mills, in the county of Aroostook and State of Maine, have invented certain new and useful Improvements in Sawing-Machines, of which the following is a specification.

This invention relates to sawing machines and more particularly to a sawing machine of that type in which the saw is mounted for movement toward and away from the work.

One of the main objects of the invention is to provide a machine of the character stated of simple construction and operation having a saw carrying frame which is rockably mounted and a saw carried thereby, means being provided for normally holding the saw frame in raised position. A further object is to provide a simple and efficient means for depressing the saw frame so as to move the saw into engagement with the work, means being provided for automatically raising the saw when the depressing means is released. A still further object is to provide a sawing machine of the character stated of very simple construction in which all unnecessary parts are eliminated. Further objects will appear from the detailed description.

In the drawings:

Figure 1 is a top plan view of a sawing machine constructed in accordance with my invention Fig. 2 is a side view of the same Fig. 3 is a front view Fig. 4 is a detail of the toggle-lever for operating the saw frame Fig. 5 is a fragmentary detail of the control lever and the parts associated therewith for depressing and raising the saw frame.

The main supporting frame of the machine is of rectangular shape being provided with the base beams 1 and 2, the vertical posts 3 and 4, transverse plates 5, and the standards 6, 7 and 8 secured on the base beams 1 and 2 at the approximate longitudinal center thereof, these standards being in alinement transversely of the main frame. A side beam 9 is supported by the post 3 and stand 8 at one side of the main frame, a similar beam 10 being supported at the other side by the post 4 and the standard 6. A transverse beam 11 is supported by the side beams 9 and 10 in back of the posts 3 and 4. This beam 11 supports the forward ends of the central beams 12 and 13 which rest on the upper face of beam 11, the rearward ends of these beams being secured to the central standard 7 at each side thereof. A work receiving board 14 is secured on the upper faces of beams 9 and 13, a similar board 15 being mounted on beams 12 and 10. Board 14 is provided at its inner edge with a vertical back board 16, board 15 being provided with a similar back board 17. The inner ends of the boards 14 and 15 are spaced apart to provide a saw opening or passage 18.

A transverse drive shaft 19 is rotatably mounted on the standards 6, 7 and 8 in bearing-straps 20, 21, and 22, respectively secured on the upper ends thereof. A drive pulley 23 is secured on one end of shaft 19 and may be connected by a belt to a suitable source of power for rotating the shaft. A saw frame designated generally by 24 is rockably mounted on shaft 19 between the standards 6 and 7. This saw frame is composed of the side beams 25 and 26 which are rockable on the shaft, and the transverse brace bars 26, 27 and 28 secured therebetween. A saw shaft 29 is rotatably mounted at the forward end of frame 24 in bearing straps 30 and 31 secured to the upper faces of beams 25 and 26, respectively. This shaft is provided with a pulley 32 secured thereon connected by a belt 33 to a pulley 34 secured on shaft 19. By this means rotation is imparted to circular saw 35 secured on the inner end of shaft 29. As will be noted more clearly from Figs. 1 and 2 of the drawings, the shaft 18 is positioned a short distance in rear of the longitudinal center of frame 24, so that the normal tendency of this frame will be to tilt forward and downward about shaft 19 so as to bring the saw 35 into engagement with the work supported on the boards 14 and 15, the saw being positioned directly above the saw passage 18 so as to pass between the work supporting boards.

To prevent downward movement of the saw when work is not on the table I provide means for normally holding the forward portion of the saw frame in raised position. The inner beam 25 of the saw frame is provided, on its under face and about midway between the shaft 19 and the outer end of the beam, with a pair of depending spaced ears 36. These ears receive the upper end of a link 37 pivotally secured between the ears by a pin 38. This link is pivotally secured, a slight distance above its longitudinal center, between the upper ends of the spaced arms 39 and 40 by a pivot bolt 41 inserted through the link and the arms. The lower ends of the arms 39 and 40 are pivotally secured to the beam 12 by means of a pivot bolt 42 passed through the same and the beam. A link 43 is loosely secured at its forward end to link 37 adjacent the lower end thereof. The link 43 is loosely secured as at 45, to a transverse extending operating lever 46. One end of this lever is pivotally secured, as at 47, to the lateral frame beam 9. A tension coil spring 48 has its outer end secured to the lever 46 at the approximate center thereof, the inner end of the spring being secured to the center standard 7. Spring 48 acts to normally hold the lever 46 in its innermost position, this spring also acting through link 43 to rock the link 37 about its pivotal axis so as to raise the forward end of the saw frame 24, the link 37 and arms 39 and 40 constituting, in effect, a toggle-lever for this purpose. A pull rod 49 is secured to the other end of the lever 46 as at 50, this rod being passed through a guide 51 and provided on its other end with a hand grip 52. By pulling the rod 49 outwardly, the lever 46 will be rocked outward so as to cause the link 43 to move the lower end of link 37 outward thus folding or contracting the toggle-lever so as to lower the saw 35 into engagement with the work. When the cut has been completed, the pull rod 49 is released and spring 48 acts to automatically raise the saw frame and the saw to in-operative position. By mounting the saw frame in the manner described, I insure ease of operation of the same, as the frame is pivoted but a short distance in rear of its longitudinal axis and may, therefore be easily rocked on the shaft 19.

What I claim is:

In sawing machines, a main frame, a saw frame rockably mounted intermediate its ends thereon, a link having its upper end pivotally secured to said saw frame, spaced arms pivotally secured at their lower ends to the main frame, said link being pivotally secured intermediate its ends between the upper ends of said arms, a transverse operating lever pivotally secured at one end to the main frame, means for normally holding said lever in rearward position, and a connecting link loosely secured at its forward end to the first mentioned link adjacent the lower end thereof and having its rearward end loosely secured to said operating lever whereby, when the operating lever is moved forwardly, the toggle lever formed by the link and arms will be folded and the link will be rocked rearwardly and downwardly about its axis and, when the operating lever is moved rearwardly, the toggle lever will be extended and the link will be rocked upwardly and forwardly about its axis so as to raise the saw frame.

In testimony whereof I affix my signature in presence of two witnesses.

GEORGE W. BRAGDON.

Witnesses:
EDWARD G. ROWLAND,
F. W. TARBELL.